UNITED STATES PATENT OFFICE.

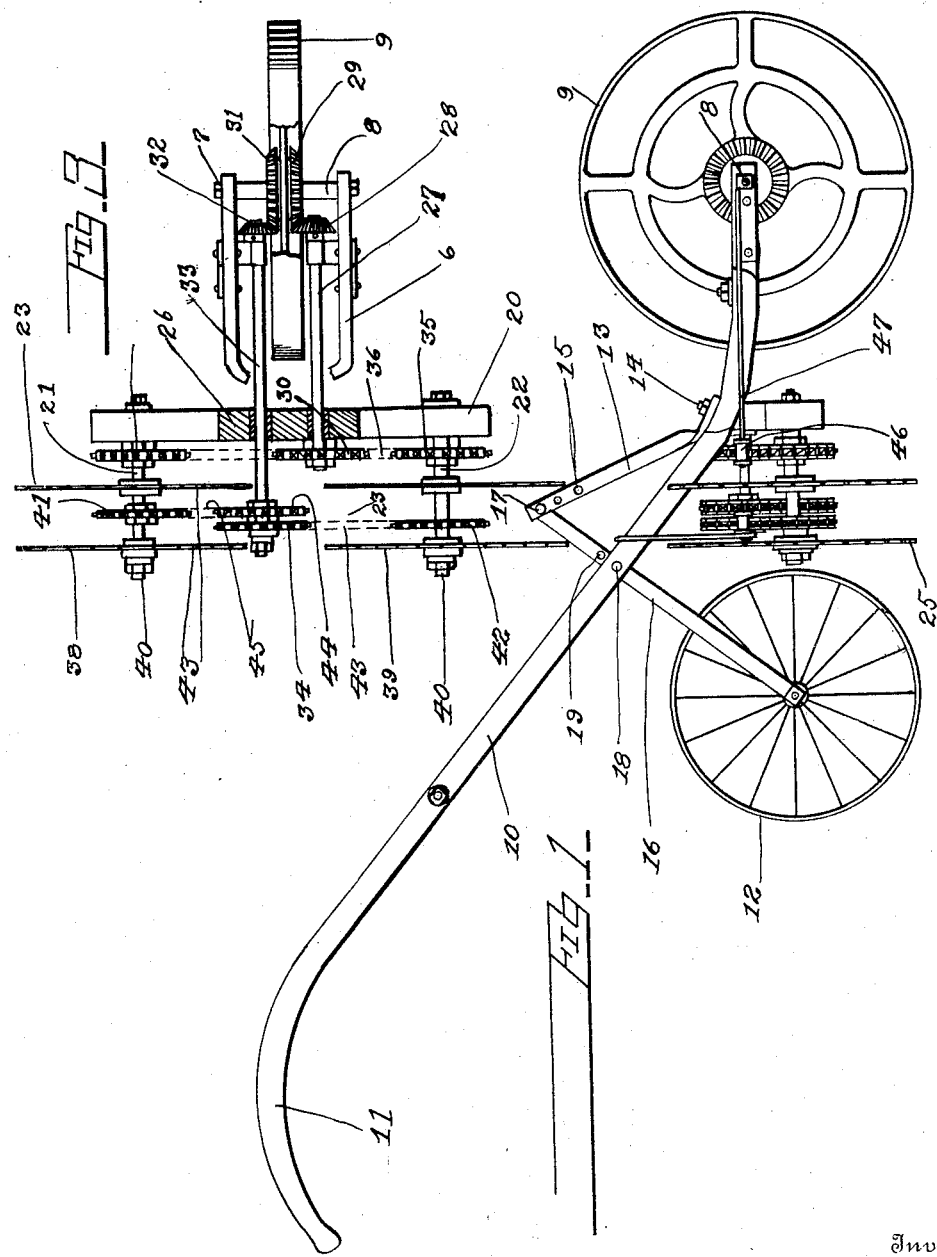

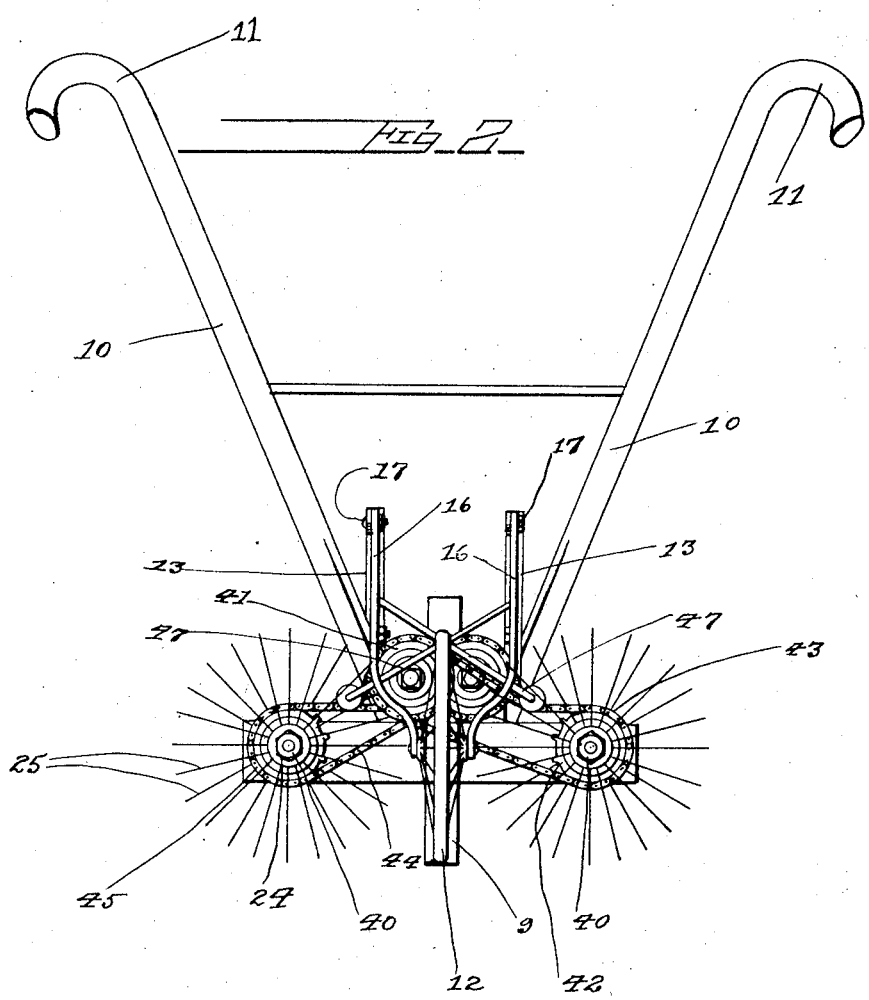

ABRAM AMEELE, OF WALWORTH, NEW YORK.

ONION-WEEDER.

1,332,095.  Specification of Letters Patent.  Patented Feb. 24, 1920.

Application filed October 9, 1919. Serial No. 329,496.

*To all whom it may concern:*

Be it known that I, ABRAM AMEELE, a citizen of the United States, residing at Walworth, in the county of Wayne and State of New York, have invented a new and useful Onion-Weeder, of which the following is a specification.

This invention has reference to garden weeding machines, and more particularly to machines of this character, controlled, and operated by manual power.

The primary object of the invention is to provide a device of this character especially constructed for weeding purposes, and more particularly to a device for weeding onions.

A further object of the invention is to provide a frame, rotary picking fingers supported by the frame, the picking fingers being arranged in pairs, the picking fingers of each pair operating in opposite directions, to efficiently remove the weeds between the onion plants.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a side elevational view of a device constructed in accordance with the present invention.

Fig. 2 is a rear elevational view of the same.

Fig. 3 is a fragmental elevational view of an onion weeder constructed in accordance with the present invention, the supporting wheels and handle being removed.

Referring to the drawings in detail, the body of the machine includes the spaced forwardly extending arms 6, supported in parallel relation with each other, and having bearings 7 formed adjacent the forward ends thereof, in which bearings, is supported the shaft 8, on which is keyed or otherwise secured, a power wheel 9.

To the rear portion of the body 5, are secured the lower extremities of the arms 10, the outer ends thereof being curved to provide the usual handles 11, to be grasped by an operator, for guiding, and forcing the machine over the ground surface, under cultivation.

A rear supporting wheel 12, is also connected to the body 5, through the medium of the arms 13, bolted to the body 5 as at 14, to prevent movement thereof with relation to the body 5, the arms 13, as shown being provided with the apertures 15, arranged adjacent one end thereof, and disposed in spaced relation with each other. These arms 13, have connection with the arms 16, as at 17, and as shown this connection is in the form of a bolt adapted to be positioned in one of the openings 15, in order that the arms 16 may be adjusted with relation to the arms 13, to permit the rear of the body 5, to be moved or adjusted vertically, with relation to the ground surface, over which the device is moving.

In order to efficiently carry out the adjusting feature, the arms 16, are pivotally connected to the arms 10, by means of the bolts 18, passing through registering openings in the arms 16 and 10, the openings 19 formed in the arms 16, may however be moved to register with the openings in the arms 10, to permit a finer adjustment of the body 5 with relation to the ground surface.

Supported adjacent the rear of the body 5, is a transversely extending bar 20, which bar, supports at each end thereof, a shaft 21 and a shaft 22, which shafts extend rearwardly and support the picking elements 23, which as shown, are supported in pairs, at opposite sides of the body 5, and each picking element includes a hub 24, and a plurality of radiating picking fingers 25, arranged in spaced relation with each other.

Supported adjacent the upper edge of the transversely extending bar 20, is a bearing block 26, which supports one end of the shaft 27, which shaft 27 is provided with a beveled pinion 28, formed adjacent the forward end thereof, and said beveled pinion 28, is constructed to mesh with the beveled pinion 29, formed integral with one of the sides of the wheel 9, whereby movement of the wheel 9 produces a relatively rotary movement of the shaft 27, with the result that the gear wheel 30, supported on the opposite end of the shaft 27, is also caused to rotate.

On the opposite side of the wheel 9, is a pinion 31, which pinion, coöperates with the beveled pinion 32, secured to the shaft 33, which shaft extends through the transverse bearing block 26, which supports the same and has secured to one end thereof the gear or sprocket wheels 34 and 44.

Each of the shafts of the picking element 23, and 23' is provided with a sprocket wheel 35, and as shown, one of the hubs of the picking elements, has connection with the shaft 27, through the medium of the chain 36, operating over the sprocket secured to the hub, which chain also operates over the sprocket wheel 30, from where it passes from the sprocket wheel 37, on the shaft of the picking element arranged in the same relation to the transverse bar, as the first mentioned picking element.

It will therefore be seen that the picking elements, adjacent the transverse bar 20, operate in the same direction. The picking elements 38 and 39, supported adjacent the outer ends of the shafts 21 and 22, and held thereon by means of the nuts 40, are also connected to the sprocket wheels 41 and 42, the sprocket wheel 42, having connection with the sprocket wheel 34, through the medium of the chain 43, whereby the picking element 39, is operated in a direction opposite to the direction of the operation of the picking element supported adjacent thereto, on the shaft 22.

Disposed adjacent the sprocket wheel 34, is a sprocket wheel 44, which sprocket wheel 44, operates the sprocket wheel 41, through the medium of the chain 45. It will thus be seen that the picking element 38, associated therewith, is operated in a direction opposite to the direction of the operation of the picking elements 23, with the result that the earth engaged by the picking fingers 25, is thrown in opposite directions.

The idlers 46, are supported on the arms 47, and engage the chains, operating over the sprocket wheel forming a part of the picking elements, thereby holding the chains tight at all times.

The operation of the device is as follows:

The machine is placed between adjacent rows of onions, at one end of the field, and is then moved along between the rows, the picking elements revolving, and contacting with the earth between the onions, throwing the same in opposite directions, and consequently, removing all weeds growing in the rows.

From the foregoing it is obvious that the machine operates on two rows simultaneously, thus increasing the work of weeders of this character, wherein only one picking element is employed.

Having thus described the invention, what is claimed is:—

In a weeding machine, a body including spaced arms, a power wheel operating between the spaced arms and having beveled pinions supported on opposite sides thereof to move with the power wheel, a transversely extending bar forming a part of the body, said bar having openings extending therethrough, brackets supported by the spaced arms, a shaft disposed through each of the openings in the bar and supported by the brackets, pinions coöperating with the beveled pinions of the power wheel, each of said shafts having a sprocket wheel supported on one end thereof, stub shafts supported by the bar adjacent the ends thereof, rotary picking elements supported on each of the stub shafts, and means for connecting the rotary picking elements to the first mentioned shafts whereby movement of the shafts causes the picking elements of each stub shaft to revolve in opposite directions.

In testimony that I claim the foregoing as my own, I have hereto affixed my signature in the presence of two witnesses.

ABRAM AMEELE.

Witnesses:
 FRED KIPHUT,
 A. J. CLENINGER.